United States Patent
Rodgers et al.

(10) Patent No.: US 8,602,458 B2
(45) Date of Patent: Dec. 10, 2013

(54) WELLHEAD PIPE COUPLING

(75) Inventors: Doyle W. Rodgers, Longview, TX (US); Keith David Farquharson, Edmonton (CA)

(73) Assignee: Stream-Flo Industries Ltd., Edmonton (CA)

(*) Notice: Subject to any disclaimer, the term of this patent is extended or adjusted under 35 U.S.C. 154(b) by 331 days.

(21) Appl. No.: 12/856,155

(22) Filed: Aug. 13, 2010

(65) Prior Publication Data
US 2011/0037251 A1 Feb. 17, 2011

Related U.S. Application Data

(60) Provisional application No. 61/233,693, filed on Aug. 13, 2009.

(51) Int. Cl.
*F16L 33/18* (2006.01)

(52) U.S. Cl.
USPC ........... 285/348; 285/104; 285/339; 285/345; 277/608

(58) Field of Classification Search
USPC ................. 277/314, 608, 609, 619–621, 344; 285/104, 105, 113, 322, 324, 339–343, 285/356, 302, 328–330, 123.1, 285/123.12–123.14, 345–348, 285/148.23–148.26, 375, 911
See application file for complete search history.

(56) References Cited

U.S. PATENT DOCUMENTS

| | | | |
|---|---|---|---|
| 867,628 A * | 10/1907 | Williamson | 285/356 |
| 931,171 A | 8/1909 | Williams | |
| 2,047,569 A | 7/1936 | Loomis | |
| 2,610,689 A * | 9/1952 | Eckel | 285/123.9 |
| 3,065,000 A | 11/1962 | Stanton | |
| 3,233,907 A | 2/1966 | Stanton | |
| 3,653,671 A * | 4/1972 | Shipes | 277/328 |
| 4,239,266 A | 12/1980 | Mynhier | |
| 4,304,424 A | 12/1981 | Hansen | |
| 4,468,039 A * | 8/1984 | Le et al. | 277/520 |
| 4,936,382 A | 6/1990 | Thomas | |
| 5,299,644 A | 4/1994 | Eckert | |
| 5,332,043 A | 7/1994 | Ferguson | |
| 5,342,066 A * | 8/1994 | Henley et al. | 277/329 |
| 6,834,718 B2 | 12/2004 | Webster | |
| 2008/0203727 A1* | 8/2008 | Bradley | 285/415 |
| 2009/0223661 A1 | 9/2009 | Khazanovich et al. | |

FOREIGN PATENT DOCUMENTS

FR 809441 3/1937

OTHER PUBLICATIONS

International Preliminary Report on Patentability, dated Feb. 14, 2012, corresponding to International Application No. PCT/CA2010/001254 (filed Aug. 13, 2010), parent of the present application, 6 pp.

* cited by examiner

*Primary Examiner* — James Hewitt
*Assistant Examiner* — Jay R Ripley
(74) *Attorney, Agent, or Firm* — Lathrop & Gage LLP

(57) ABSTRACT

A wellhead coupling and method for coupling and sealing an annulus formed between overlapping ends of an outer pipe and an inner pipe. A clamp housing grips the inner pipe, forms a horizontal landing base for the outer pipe, and forms circumferential ports aligned with the annulus. A seal ring and upper metal ring are located in the annulus, the seal ring being formed with ports to align with ports of the clamp housing, and the upper metal ring being formed with threaded holes to align with ports of the seal ring and the clamp housing. Threaded seal engaging members extend through the aligned ports for threaded connection in the threaded holes of the upper metal ring. A seal energizing member located within or below the clamp housing pulls downwardly on the threaded seal engaging members to energize the seal ring into sealing relationship in the annulus.

13 Claims, 7 Drawing Sheets

WELLHEAD PIPE COUPLING

CROSS-REFERENCE TO RELATED APPLICATIONS

This application claims priority from U.S. Provisional Patent Application No. 61/233,693 filed Aug. 13, 2009, which is incorporated by reference herein in its entirety to the extent that there is no inconsistency with the present disclosure.

BACKGROUND OF THE INVENTION

This invention relates to a wellhead coupling between overlapping ends of two pipes. The invention also extends to a method of forming a wellhead coupling between two pipes.

Drilling of oil or gas wells typically involves attaching a drilling stack to a conductor pipe or to a surface casing on a temporary basis. Known wellhead connections to surface casings or conductor pipes do not readily accommodate this type of drilling stack attachment, see for example the following exemplary patents—U.S. Pat. No. 4,304,424 to Hanson, U.S. Pat. No. 4,239,266 to Mynhier, U.S. Pat. No. 4,936,382 to Thomas, U.S. Pat. No. 5,299,644 to Ekert, U.S. Pat. No. 5,332,043 to Ferguson, and U.S. Pat. No. 6,834,718 to Webster. There is still a need for a wellhead coupling to surface casing or conductor pipe which will accommodate a drilling stack and which will also allow for quick makeup and disassembly after drilling.

SUMMARY OF THE INVENTION

The present invention provides a wellhead coupling and method of forming a wellhead coupling, particularly as it relates to connecting a lower end of an outer pipe over an upper end of an inner pipe, when the inner pipe is a surface casing or a conductor pipe of a wellhead.

In the preferred embodiment of the figures, the wellhead coupling is shown between an outer pipe having a diameter greater than the inner pipe. The invention has broad application to other wellhead connections. Thus the terms "casing", "surface casing", "conductor pipe" and "inner pipe" as used herein and in the claims are meant to include any tubular pipe at a wellhead, over which an "outer pipe" of larger diameter, is to be connected.

Broadly stated, the invention provides a pipe coupling for coupling together and sealing an annulus formed between overlapping ends of an outer pipe and an inner pipe, in which the lower end of the outer pipe is vertically axially aligned over the upper end of the inner pipe, comprising:

a. a housing having a cylindrical bore and adapted to be attached to an outer surface of the inner pipe to form a landing base for the overlapping end of the outer pipe;
b. a seal assembly adapted to be positioned in the annulus formed between the overlapping ends of the outer and inner pipe, the seal assembly including an upper metal ring adapted to be positioned in the annulus, and a seal ring adapted to be positioned in the annulus between the upper metal ring and the housing;
c. threaded seal engaging members adapted to be connected between the housing and the upper ring; and
d. a seal energizing member adapted to be held within or below the housing and to pull downwardly on the threaded seal engaging members to energize the seal ring into sealing relationship in the annulus.

In a preferred wellhead context, the invention provides a wellhead coupling for coupling together and sealing an annulus formed between overlapping ends of an outer pipe and an inner pipe, in which the lower end of the outer pipe is vertically axially aligned over the upper end of the inner pipe, comprising:

a. a housing having a cylindrical bore and adapted to be attached in gripping relationship to an outer surface of the inner pipe to form a horizontal landing base for the lower end of the outer pipe, the housing being formed with a plurality of circumferentially spaced bolting ports located to be vertically aligned with the annulus;
b. a seal ring adapted to form a seal in the annulus;
c. an upper metal ring adapted to be vertically spaced apart from the housing in the annulus by the seal ring;
d. the seal ring being formed with bolting ports located to be aligned with the bolting ports of the housing and the upper metal ring being formed with threaded holes located to be aligned with the bolting ports of each of the seal ring and the housing;
e. threaded seal engaging members adapted to extend through the aligned bolting ports of the housing and the seal ring for threaded connection in the threaded holes of the upper metal ring: and
f. a seal energizing member adapted to be held within or below the clamp housing and to pull downwardly on the threaded seal engaging members to energize the seal ring into sealing relationship in the annulus.

The invention also broadly extends to a method of coupling together and sealing an annulus formed between overlapping ends of an outer pipe and an inner pipe, in which the lower end of the outer pipe is vertically axially aligned over the upper end of the inner pipe. The method comprises:

a. attaching a housing having a cylindrical bore in gripping relationship to an outer surface of the inner pipe to form a horizontal landing base for the lower end of the outer pipe, the housing being formed with circumferentially spaced bolting ports vertically aligned with the annulus;
b. providing a seal assembly in a vertical stack above the housing, the seal assembly including an upper metal ring vertically spaced apart from the clamp housing by a seal ring, the seal ring being formed with bolting ports aligned with the bolting ports of the housing, the upper metal ring being formed with threaded bolt holes aligned with the bolting ports of the housing and the seal ring;
c. inserting threaded seal engaging members through the aligned bolting ports of the housing and the seal ring and into the threaded holes of the upper metal ring;
d. lowering the outer pipe over the upper end of the inner pipe to rest on the housing such that the seal assembly is contained in the annulus between the outer pipe and the inner pipe; and
e. engaging a seal energizing member to be held within or below the clamp housing to pull downwardly on the threaded seal engaging members to energize the seal ring into sealing relationship in the annulus.

BRIEF DESCRIPTION OF THE DRAWINGS

FIG. 5 also shows an outer welded ring and hold down ring to connect the outer pipe to the clamp housing.

DETAILED DESCRIPTION OF THE INVENTION

As used herein and in the claims, the word "comprising" is used in its non limiting sense to mean that items following the word in the sentence are included and that items not specifically mentioned are not excluded. The use of the indefinite article "a" in the claims before an element means that one of the elements is specified, but does not specifically exclude others of the elements being present, unless the context clearly requires that there be one and only one of the elements. For example, the term "a seal ring" as used herein and in the claims may include multiple seal rings such as a pair of seal rings.

Figure 1:
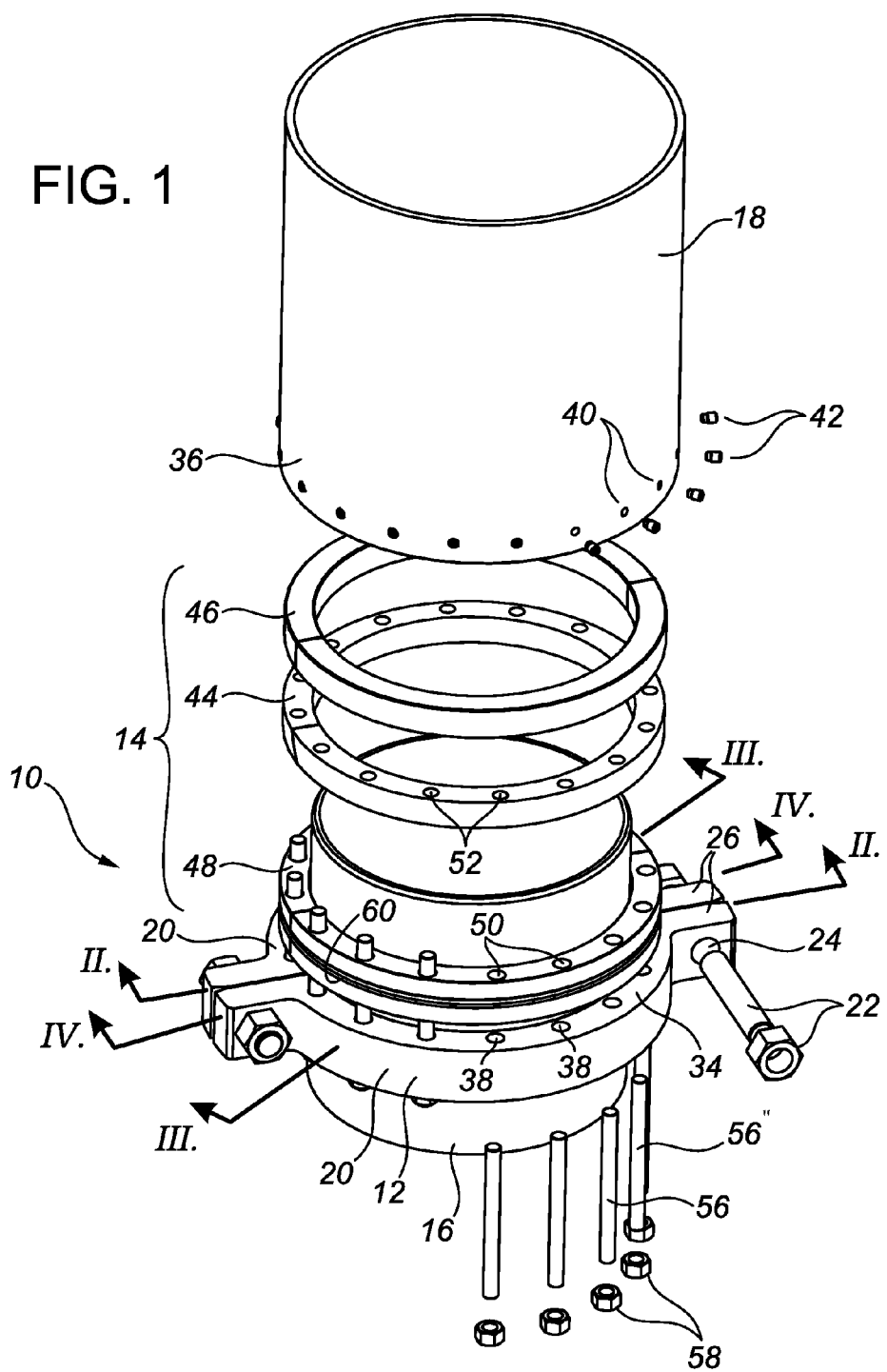
FIG. 1 is an exploded top perspective view of the components of one exemplary embodiment of a wellhead coupling, showing the clamp housing attached in gripping relationship to the outer surface of the inner pipe, and the seal assembly components in vertical alignment for installation in the annulus between the outer pipe and the inner pipe.
Figure 2:
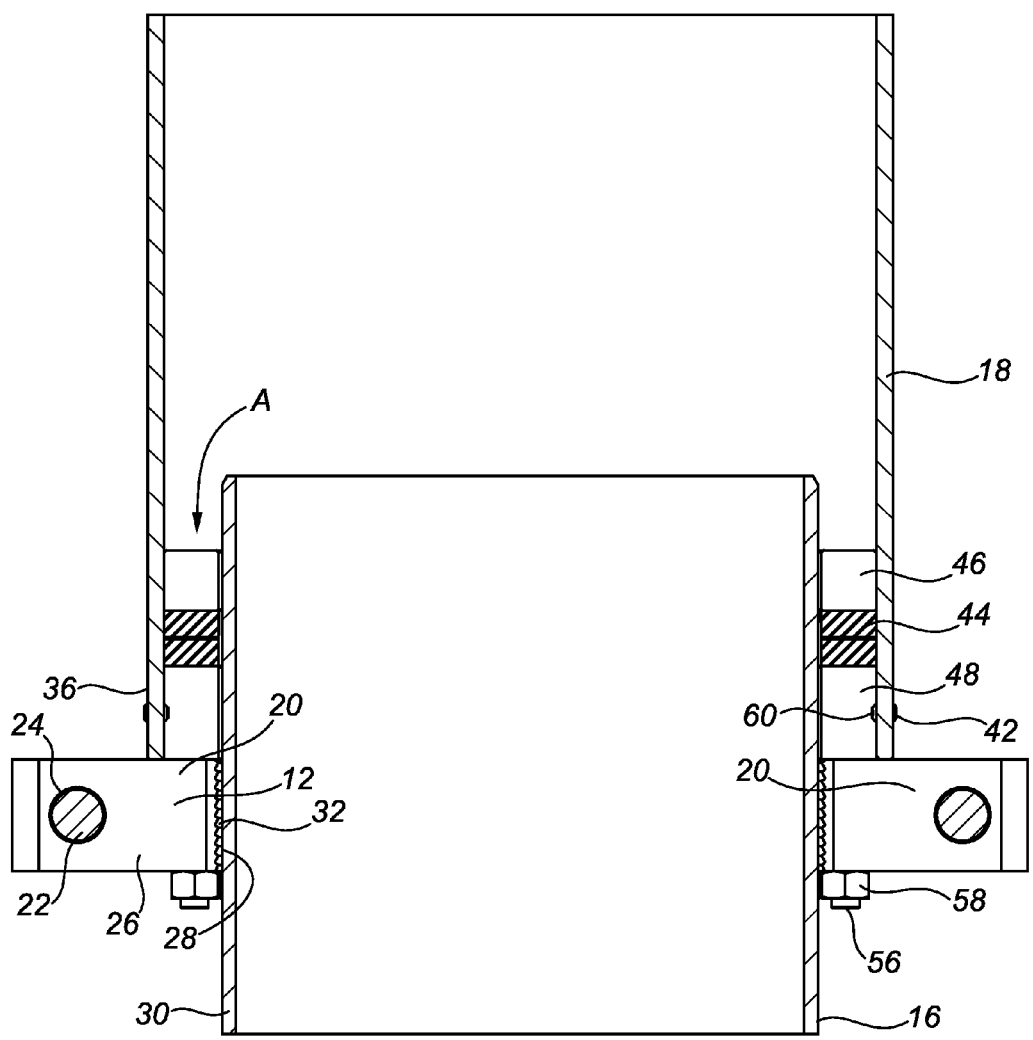
FIG. 2 is a side sectional view of the wellhead coupling taken along line II-II of FIG. 1, with the pipe ends overlapping and connected, and the clamp housing and seal assembly components fully connected.
Figure 3:
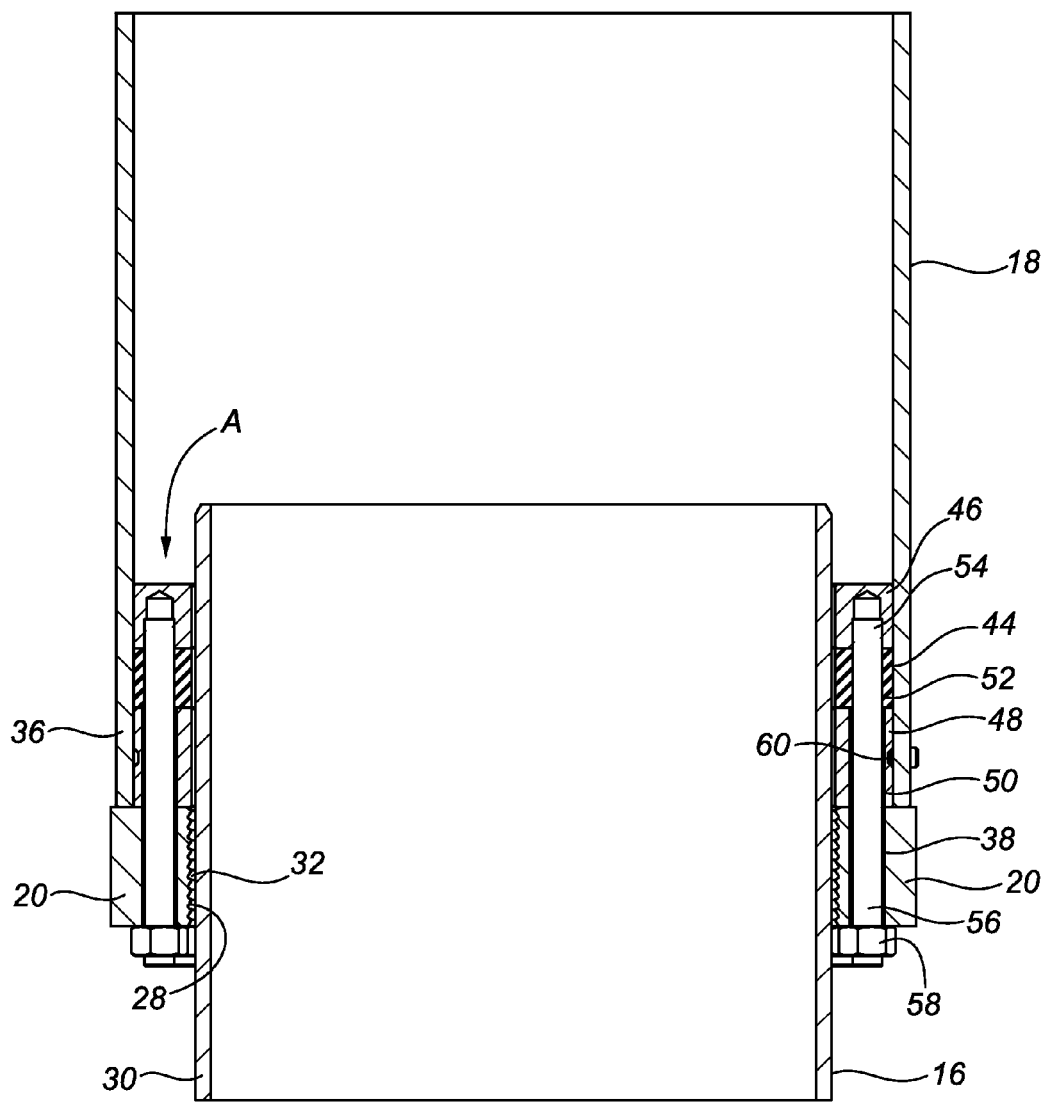
FIG. 3 is a side sectional view of the wellhead coupling rotated 90° to the view of FIG. 2 to show the threaded bolts in the annulus prior to energizing the seal ring between upper and lower rings.
Figure 4:
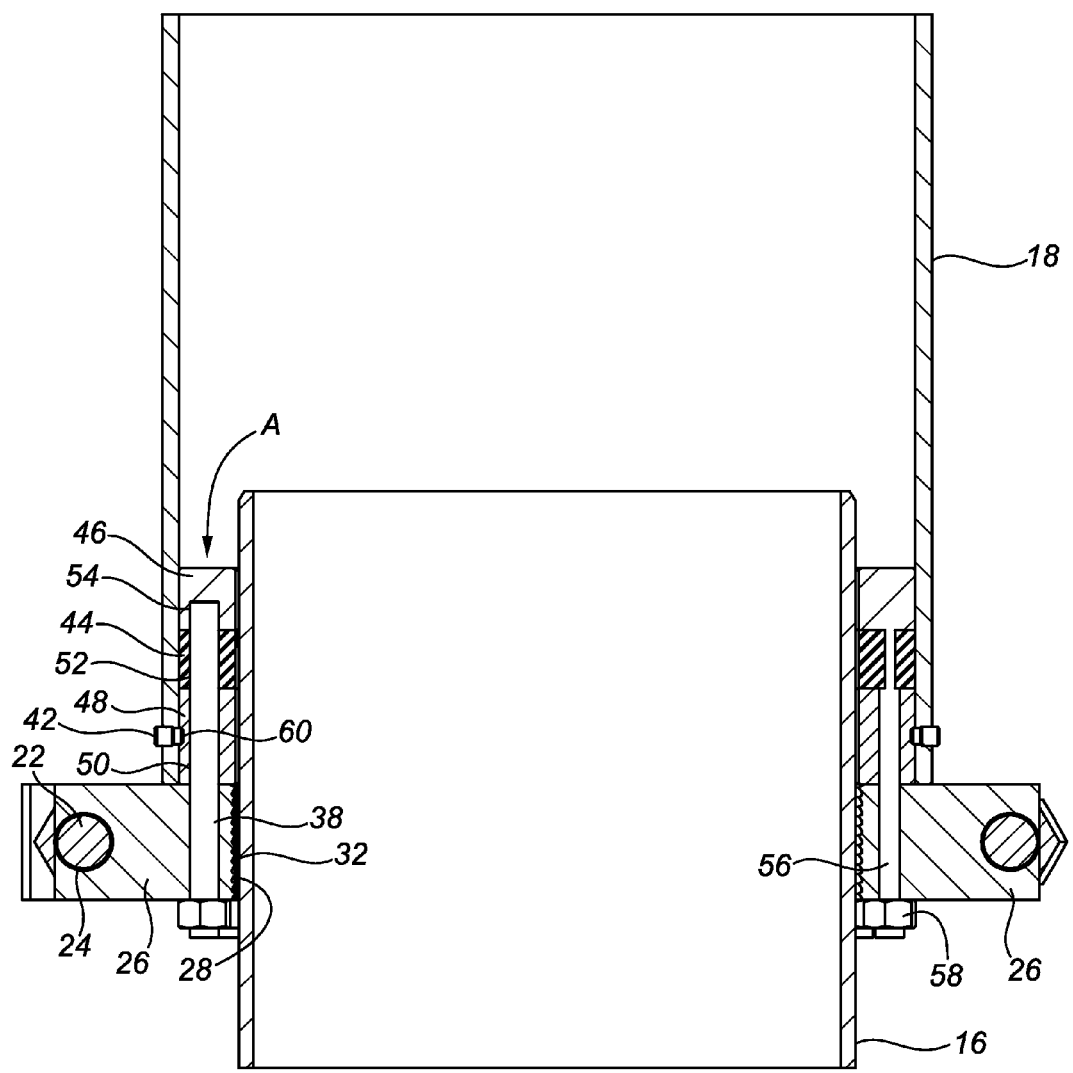
FIG. 4 is a side sectional view of the wellhead coupling taken along line IV-IV of FIG. 1, showing the components fully connected with the seal energizing bolts below the clamp housing energizing the seal assembly, and also showing the set screws extending through the lower end of the outer pipe into a circumferential groove on the lower metal ring to secure the outer pipe to the seal assembly.

Having reference to FIGS. 1-4, one exemplary embodiment of the wellhead coupling is shown generally at 10 to include a clamp housing 12 and a seal assembly 14. The clamp housing 12 is shown attached to the inner pipe 16. The seal assembly 14 is shown with components vertically aligned for sealing the annulus A (seen in FIGS. 2-4) formed between overlapping ends of the inner pipe 16 and the outer pipe 18. In FIGS. 2-4, the wellhead coupling is shown with the components 12, 14 connected in order to connect the pipe ends and seal the annulus A.

The clamp housing 12, in order to provide a landing base for the lower portion 36 of the outer pipe 18, may comprise a housing other than a strict clamp. For instance, a housing might be welded or threaded to the outer surface of the inner pipe 16. Alternatively, the clamp housing could take the form of a slip lock connection to the inner pipe, with a slip housing component forming the landing base for the outer pipe. A slip housing component is attached to the outer wall of the inner pipe, and is formed with may form a conical slip bowl at its inner bore. A number of segmented conical slips formed with inwardly projecting teeth are held in the bowl and can be energized into gripping engagement with the outer surface of the inner pipe. Thus, the term "housing" as used herein and in the claims is meant to include these and other alternative housing embodiments.

The clamp housing 12 is preferably formed from clamp half sections 20, which are connected together at their mating ends. The Figures show threaded bolt and nut connectors 22, with the bolts extending horizontally in bolt through holes 24 formed in radially projecting side arms 26, although other clamp connectors for the clamp section might be used. The connected clamp sections 20 form a cylindrical bore 28 sized to tighten around the outer surface 30 of the inner pipe 16. The clamp sections 20 are preferably formed with inwardly projecting teeth or threads 32 at the cylindrical bore 28 so that the connected clamp housing 12 attaches in gripping relationship to the outer surface 30 of the inner pipe 16. The clamp housing 12 forms a flat, horizontal landing base 34 at its upper surface for supporting the lower portion 36 of the outer pipe 18. The clamp housing 12 is connected, for example through bolting or other threaded attachment, to the seal assembly 14 as described more fully below. For this bolted or threaded connection, the clamp housing 12 is formed with circumferentially spaced vertical through ports, herein termed bolting ports, 38 (eight in each clamp half section are shown). The ports 38 are located so as to be vertically aligned with the annulus A when the outer pipe 18 is lowered into place over the inner pipe 16.

While the clamp housing 12 is shown as being formed from clamp half sections, it will be understood that it may be formed from a unitary housing member, or from more than two clamp sections which can be clamped together around the inner pipe 16. As a further alternative, the clamp housing could be formed as a C-shaped clamp which is bolted together at one side of the inner pipe. As a still further alternative, the clamp housing could be formed with a hinge on one side of the inner pipe to be bolted together at the other side of the inner pipe. Thus, the term "clamp housing" as used herein and in the claims is meant to include these and other alternative forms of a clamp housing.

Figure 5:
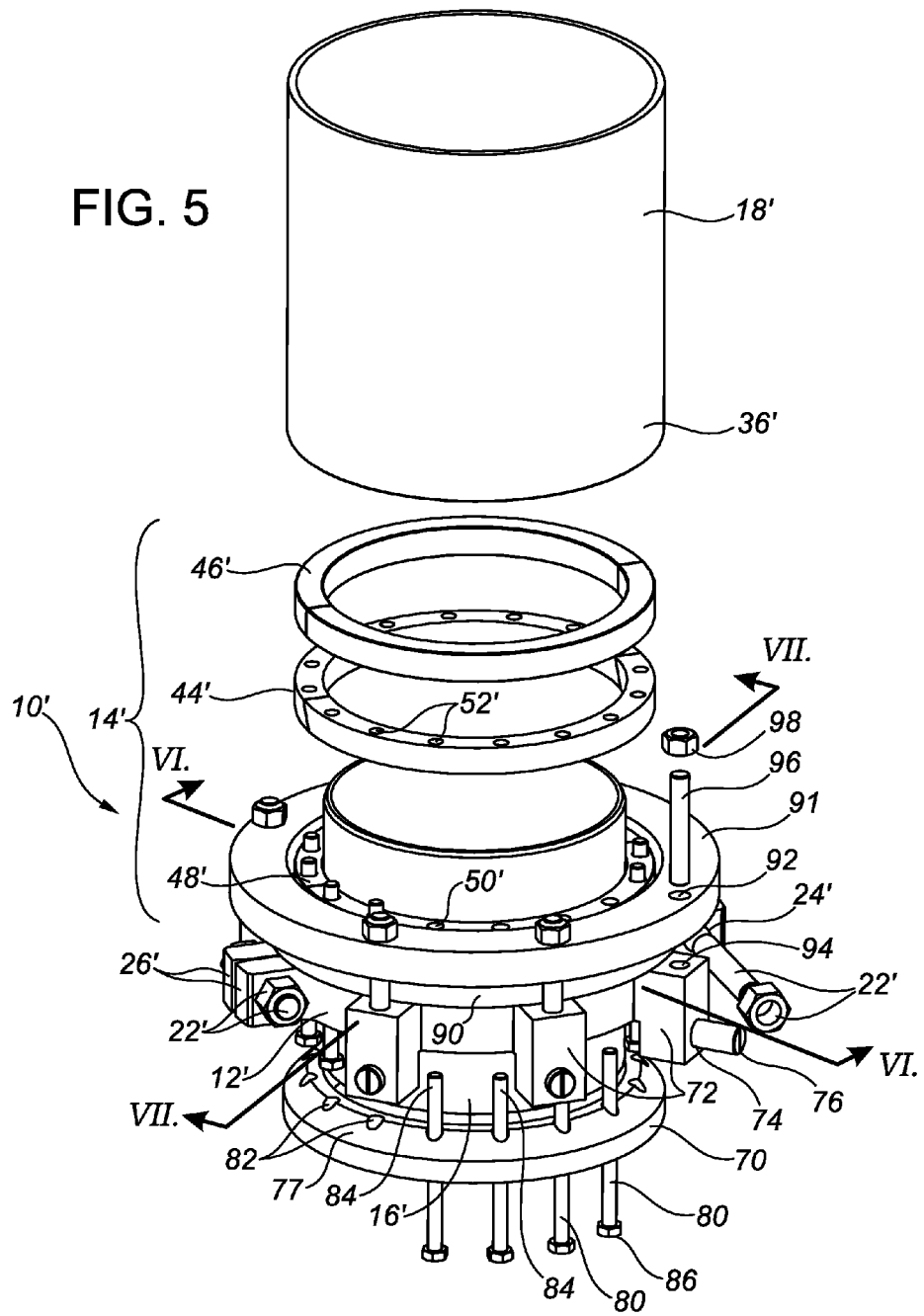
FIG. 5 is an exploded top perspective view of the components of a second embodiment of the wellhead coupling, showing the clamp housing and seal assembly components similar to FIG. 1, but showing a bottom ring below the clamp housing and radial lockdown screws for energizing the seal assembly.
Figure 6:
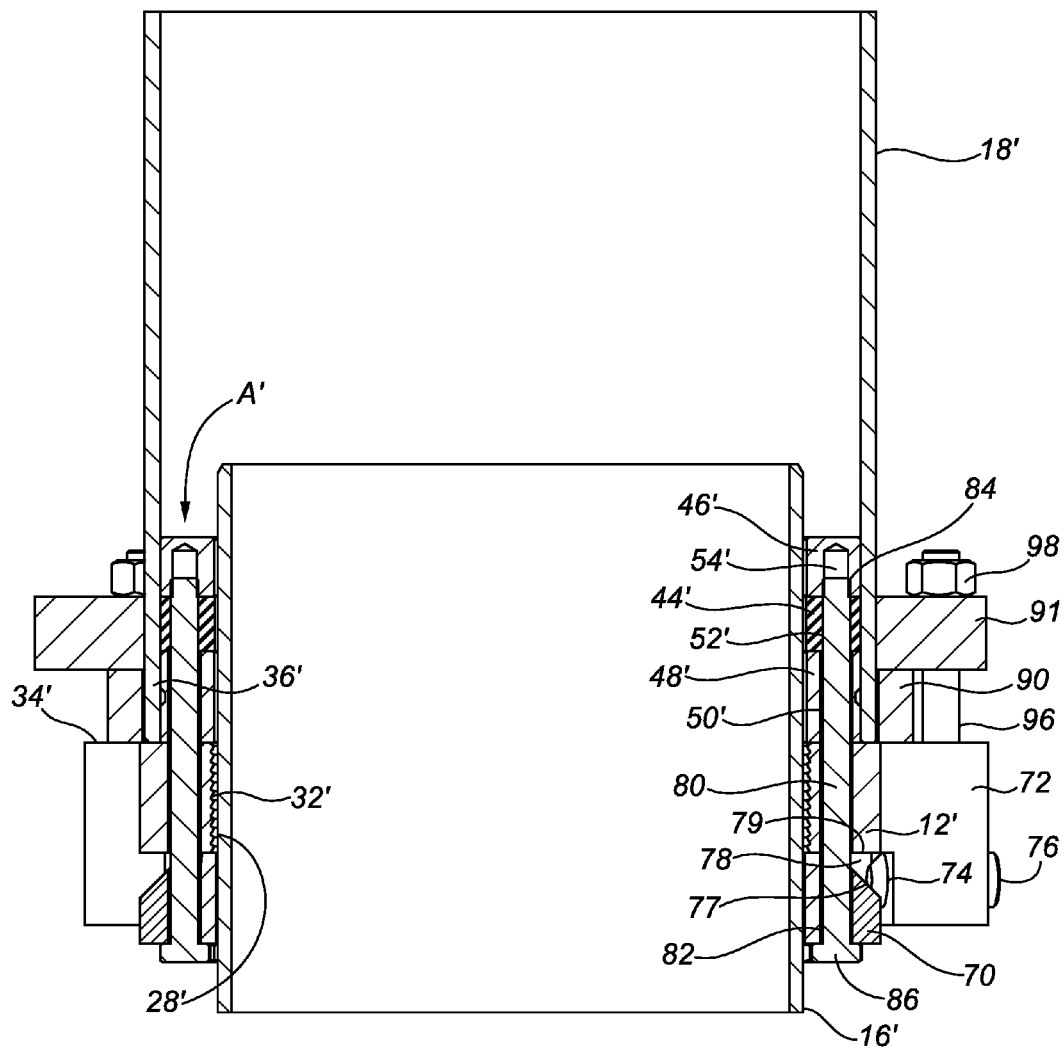
FIG. 6 is side sectional view of the wellhead coupling taken along line VI-VI of FIG. 5, with the clamp housing and seal assembly components fully connected, and the outer welded ring and hold down ring providing a connection to the clamp housing.
Figure 7:
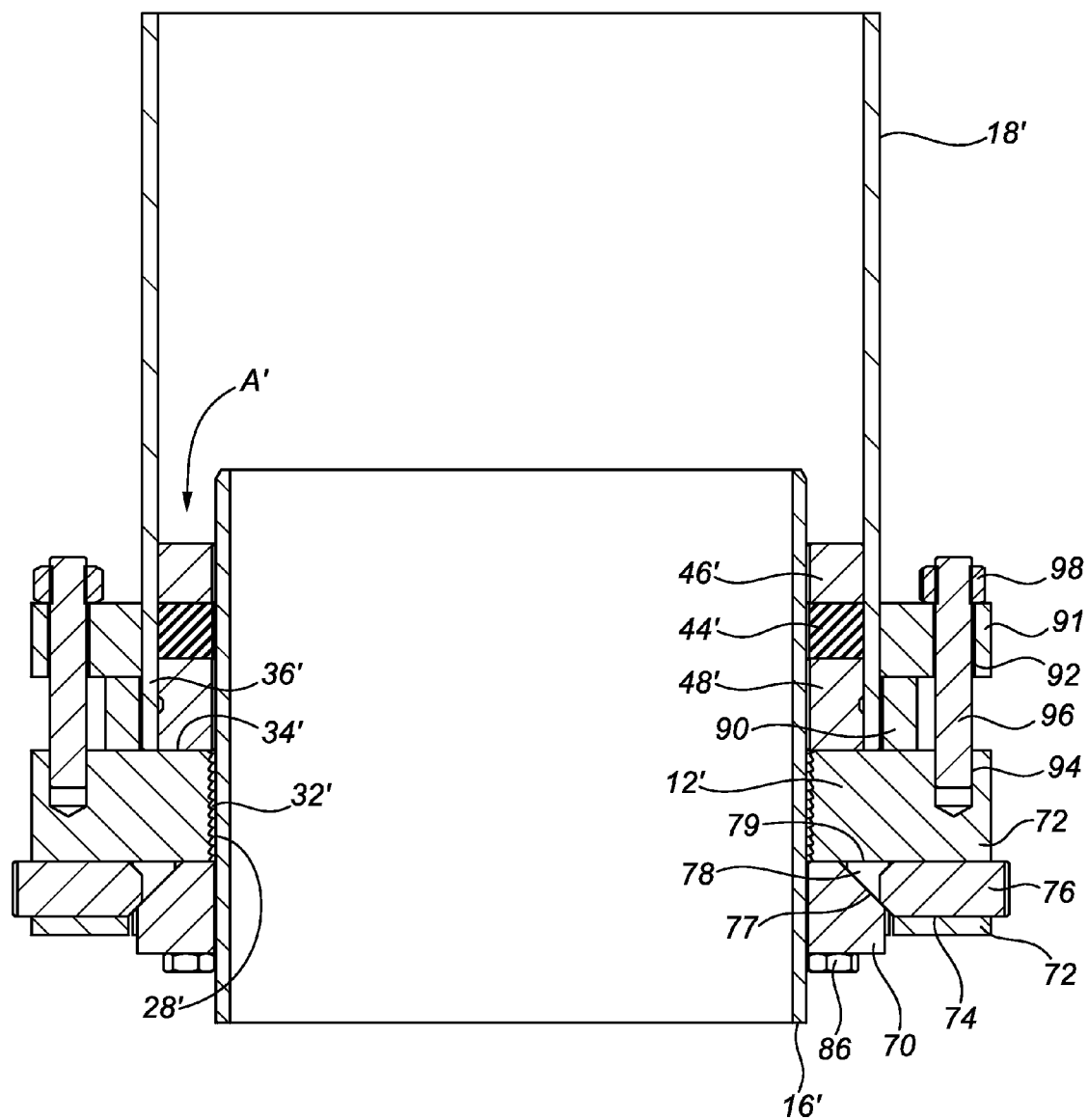
FIG. 7 is a side sectional view of the wellhead coupling taken along line VII-VII of FIG. 5, showing the outer welded ring on the outer pipe and the hold down ring connected to the clamp housing to secure the outer pipe to the seal assembly.

The lower portion 36 of the outer pipe 18 is preferably, although not necessarily, attached to the clamp housing/sealing assembly component. For low pressure applications, this attachment may not be needed. In the FIGS. 1-4, the lower portion 36 of the outer pipe 18 is shown to be formed with circumferential holes 40 to accept set screws 42, which attach to the seal assembly 14 in the manner set out below. Other methods of attachment might be used, for example a snap ring. A further alternative of one or more outer rings is shown in FIGS. 5-7 described below.

The seal assembly 14 is adapted to be positioned in the annulus A prior to putting the outer pipe 18 in place. The seal assembly 14 is energized after the outer pipe 18 is landed on the landing base provided by the clamp housing 12. Seal energizing means including threaded seal engaging members and one or more seal energizing members are more fully described below for energizing the seal assembly. The seal assembly 14 is shown to include a plurality of vertically stacked rings sized to radially fill and seal the annulus A. A preferred embodiment includes three (or more) stacked split rings, including an elastomeric seal ring 44 sandwiched between upper and lower metal (preferably steel) rings 46, 48. The elastomeric seal ring 44 might include multiple rings if desired. The lower metal ring 48 and the seal ring 44 are each formed with through ports, herein termed bolting ports, 50, 52 located to be vertically aligned with the bolting ports 38 of the clamp housing 12. The upper metal ring 46 is formed with threaded holes 54 (see FIGS. 3, 4), also vertically aligned with the bolting ports 38, 50 and 52. The seal assembly 14 is bolted to the clamp housing 12 with seal energizing bolts 56, threaded at their ends. The bolts 56 extend vertically through the aligned ports 38, 50 and 52 and are threaded into the threaded holes 54 in the upper metal ring 46. The ports 38, 50 and 52 are sized for a close fit with the bolts 56 to ensure good sealing. Seal energizing nuts 58 are tightened onto the lower ends of the bolts 56, below the clamp housing 12, to energize the seal ring 44 and to seal the annulus A.

In an alternative embodiment, the bolts 56 and nuts 58 might be replaced by cap screws (shown as 56" in FIG. 1), having threaded ends received in the threaded holes 54 of the upper metal ring 46, and head ends held below, or recessed within, the clamp housing 12. In such an embodiment, the cap screws each provide both a threaded seal engaging member (threaded screw portion) and a seal energizing member (head end of cap screw) in a unitary component.

The lower metal ring 48 may be formed with a circumferential groove 60 on its outer surface, located to accept set screws 42 extending through the lower portion 36 of the outer pipe 18. The screws 42 retain the outer pipe 18 to the lower metal ring 48, and thus to the seal assembly 14.

Alternate seal assembly/seal energizing means might be used. For instance, the lower ring 48 might be omitted and the seal ring 44 might be energized against the clamp housing 12 itself, or against a raised rim on a clamp housing. Alternatively, the lower ring 48 might be formed as a split ring to be wedged upwardly by seal energizing means to compress the seal ring 44. A still further alternative embodiment is shown in FIGS. 5-7, and is described below.

In a preferred wellhead embodiment, the inner pipe 16 may be the upper end of a surface casing or a conductor pipe on an oil or gas well and the outer pipe 18 may function as, or be attached to the bottom end of a drilling stack used for well control while drilling an oil or gas well. In such an embodiment, the wellhead coupling 10 can thus be used to attach a drilling stack to a conductor pipe or surface casing in an oil or gas well, while allowing for quick makeup and disassembly of this coupling. All of the components can be removed after drilling for use on the next well. Subsequent wellhead components can be landed or supported on the conductor that may overhang or have a larger diameter than the conductor. Splitting the clamp housing 12 and the seal assembly ring components 44, 46 and 48 allows the wellhead coupling 10 to be removed in that embodiment. However, the split nature of the clamp housing and seal assembly ring components is not needed for all possible embodiments of the invention, and are thus only preferred features of the invention.

In some applications, the outer and/or inner pipes 18, 16 may be included as components of the wellhead coupling. Depending on the wellhead application, the outer and/or inner pipe might be modified above or below the coupling shown in the Figures, for instance to include connectors, flanges, inserts, outlets, ports, shoulders, machined profiles and the like. Alternatively, the outer pipe 18 might comprise the equipment of well servicing or drilling crews, in which case the wellhead coupling of this invention may serve as a quick coupling.

In the second embodiment shown in FIGS. 5-7, a bottom ring 70 is included below the clamp housing 12', surrounding the inner pipe 16' to energize the seal assembly 14'. The seal assembly 14' is similar to that of FIGS. 1-4, including upper metal ring 46', lower metal ring 48' and seal ring 44', as described above. Like parts are labeled similarly, with the addition of a prime after the reference numeral. The clamp housing 12' is similar to that of FIGS. 1-4, but includes a plurality of downwardly extending clamp housing extensions 72 at the outer periphery of the clamp housing 12'. Each clamp housing extension 72 is formed with a threaded side port 74 to accept a threaded lockdown screw 76. Alternatively, the clamp housing 12' could be formed with an integral downwardly extending rim to accommodate radial lockdown screws. The bottom ring 70 is formed with a tapered upper peripheral surface 77 so as to form a circumferential locking groove 78 (see FIG. 6, 7) with the lower edge 79 of the clamp housing 12'. The circumferential locking groove 78 is aligned with the side ports 74 and lockdown screws 76. Threaded cap screws 80 extend through bottom ring ports 82 formed in the bottom ring 70 for alignment with the bolting ports 38' of the clamp housing 12', the bolting ports 50' of the lower metal ring 48', the ports 52' of the seal ring 44' and into the threaded holes 54' of the upper metal ring 46'. The threaded cap screws 80 have a threaded end 84, which is threaded into the threaded holes 54' of the upper metal ring 46', and a head end 86 which is secured below (or recessed within) the bottom ring 70. Once the seal assembly 14' is thus secured with the threaded cap screws 80, the seal is energized by threading the lockdown screws 76 radially through the side ports 74 into the circumferential locking groove 78 between the bottom ring 70 and the clamp housing 12', so as to drive the bottom ring 70, and thus the head ends 86 of the threaded cap screws 80 (and the threaded cap screws 80) downwardly. This action pulls downwardly on the upper metal ring 46' to energize the seal ring 44 in a manner similar to that described for seal energizing bolts 56 and seal energizing nuts 58 of FIGS. 1-4.

For ease of removal, the bottom ring 70 may be formed as a split ring, although this is not necessary for the invention. The threaded cap screws 80 might be replaced by threaded bolts and nuts, with the nuts positioned below, or recessed within, the bottom ring 70.

To secure the outer pipe 18' to the seal assembly 14' and clamp housing 12' in FIGS. 5-7, an outer welded ring 90 is welded on the lower portion 36' of the outer surface of the outer pipe 18'. A hold down ring 91, shown as having a larger diameter than welded ring 90, is included around the outer pipe 18', above the welded ring 90. The hold down ring 91 is formed with vertical through ports 92, aligned with threaded holes 94 in the upper surface of the clamp housing extensions 72. Hold down bolts 96 are threaded between the through ports 92 into the housing extensions 72, and nuts 98 are fastened to the bolts 96 at the upper surface of the hold down ring 91 to secure the outer pipe 18' to the clamp housing 12', and thus to the seal assembly 14'. Threaded cap screws might be used as an alternative to the bolts and nuts 96, 98. The rings 90, 91 might alternatively be formed as an integral ring welded or otherwise attached to the outer surface at the lower portion 36' of the outer pipe 18'. Providing a separate hold down ring 91 eases alignment for connecting to the clamp housing 12'.

In applications of low pressure, and with tight tolerances, the outer pipe 18' may not need to be secured to the clamp housing 12' and seal assembly 14'. Alternate methods of securing the outer pipe 18' may be used, for example a snap ring could be used in place of the rings 90, 91.

All references mentioned in this specification are indicative of the level of skill in the art of this invention. All references are herein incorporated by reference in their entirety to the same extent as if each reference was specifically and individually indicated to be incorporated by reference. However, if any inconsistency arises between a cited reference and the present disclosure, the present disclosure takes precedence. Some references provided herein are incorporated by reference herein to provide details concerning the state of the art prior to the filing of this application, other references may be cited to provide additional or alternative device elements, additional or alternative materials, additional or alternative methods of analysis or application of the invention.

The terms and expressions used are, unless otherwise defined herein, used as terms of description and not limitation. There is no intention, in using such terms and expressions, of excluding equivalents of the features illustrated and described, it being recognized that the scope of the invention is defined and limited only by the claims which follow. Although the description herein contains many specifics, these should not be construed as limiting the scope of the invention, but as merely providing illustrations of some of the embodiments of the invention.

One of ordinary skill in the art will appreciate that elements and materials other than those specifically exemplified can be employed in the practice of the invention without resort to undue experimentation. All art-known functional equivalents, of any such elements and materials are intended to be included in this invention. The invention illustratively described herein suitably may be practiced in the absence of any element or elements, limitation or limitations which is not specifically disclosed herein.

We claim:

1. A pipe coupling comprising:
   an outer pipe having a lower end and an inner pipe having an upper end such that the lower end of the outer pipe is overlapping with the upper end of the inner pipe to form an annulus between the overlapping ends, and the lower end of the outer pipe being vertically axially aligned over the upper end of the inner pipe;
   a housing having a cylindrical bore and adapted to be attached in gripping relationship to an outer surface of the inner pipe to form a horizontal landing base for the overlapping lower end of the outer pipe;
   a seal assembly adapted to be positioned in the annulus formed between the overlapping ends of the outer and inner pipe, the seal assembly including an upper metal ring adapted to be positioned in the annulus, and a seal ring adapted to be positioned in the annulus between the upper metal ring and the housing;
   threaded seal engaging members adapted to be connected between the housing and the upper ring; and
   a seal energizing member adapted to be engaged with each of the threaded seal engaging members from below the housing and to pull downwardly on the threaded seal engaging members to energize the seal ring into sealing relationship in the annulus.

2. A wellhead coupling comprising:
   an outer pipe having a lower end and an inner pipe having an upper end such that the lower end of the outer pipe is overlapping with the upper end of the inner pipe to form an annulus between the overlapping ends, and the lower end of the outer pipe being vertically axially aligned over the upper end of the inner pipe;
   a housing having a cylindrical bore and adapted to be attached in gripping relationship to an outer surface of the inner pipe to form a horizontal landing base for the overlapping lower end of the outer pipe, the housing being formed with a plurality of circumferentially spaced bolting ports located to be vertically aligned with the annulus;
   a seal ring adapted to form a seal in the annulus;
   an upper metal ring adapted to be vertically spaced apart from the housing in the annulus by the seal ring;
   the seal ring being formed with bolting ports located to be aligned with the bolting ports of the housing and the upper metal ring being formed with threaded holes located to be aligned with the bolting ports of each of the seal ring and the housing;
   threaded seal engaging members adapted to extend through the aligned bolting ports of the housing and the seal ring for threaded connection in the threaded holes of the upper metal ring: and
   a seal energizing member adapted to be engaged with each of the threaded seal engaging members from below the housing and to pull downwardly on the threaded seal engaging members to energize the seal ring into sealing relationship in the annulus.

3. The wellhead coupling of claim 2, wherein the housing is formed with inwardly projecting teeth at the cylindrical bore for gripping the outer surface of the inner pipe.

4. The wellhead coupling of claim 3, wherein:
   the housing is a clamp housing formed in a plurality of mating clamp sections adapted to be connected together around the outer surface of the inner pipe; and
   the connected clamp sections are formed with the inwardly projecting teeth at the cylindrical bore for gripping the outer surface of the inner pipe.

5. The wellhead coupling of claim 4, wherein the clamp housing is formed in two clamp half sections which are adapted to be bolted together around the inner pipe.

6. The wellhead coupling of claim 5, wherein the seal ring is split to form two half ring sections.

7. The wellhead coupling of claim 6, further comprising:
   a lower metal ring adapted to be positioned in the annulus between the seal ring and the clamp housing, the lower metal ring being formed with bolting ports located to be aligned with the bolting ports of each of the seal ring and the clamp housing.

8. The wellhead coupling of claim 7, wherein each of the upper and lower metal rings is split to form two half ring sections.

9. The wellhead coupling of claim 6, wherein the seal ring is one or more elastomeric seal rings.

10. The wellhead coupling of claim 6, wherein the threaded seal engaging members each comprise:
    a seal energizing bolt threaded at opposed ends, and wherein the seal energizing member comprises a plurality of nuts, each adapted to be threaded on the seal energizing bolt below the clamp housing; or
    a threaded cap screw.

11. The wellhead coupling of claim 6, wherein:
    the seal energizing member further comprises:
       a bottom ring adapted to be positioned below the clamp housing, and being tapered at an upper peripheral surface so as to form a circumferential locking groove with a lower portion of the clamp housing, the bottom ring being formed with a plurality of vertical through ports for alignment with the bolting ports of the clamp housing;
       the clamp housing including or forming a downwardly extending clamp housing extension at the outer periphery of the clamp housing, the clamp housing extension being formed to provide a plurality of threaded side ports extending there through for alignment with the circumferential locking groove; and
       a threaded lockdown screw extending through each of the threaded side ports; and wherein
    the threaded seal engaging members comprise:
       threaded cap screws, each having a head end and a threaded end, and being adapted to extend between the bottom ring and the upper metal ring with the threaded end in the threaded holes of the upper metal ring and the head end secured by the bottom ring;
    such that, once the threaded cap screws are threaded into the upper metal ring, with the head ends of the cap screws held by the bottom ring, subsequent radial inward movement of the threaded lockdown screws into the circumferential locking groove causes downward movement of the bottom ring, the threaded cap screws, and the upper metal ring to energize the seal ring.

12. The wellhead coupling of claim 6, which further comprises:
the lower metal ring being formed with a circumferential groove in its outer surface adapted and located to accept screws extending through the lower end of the outer pipe to retain the outer pipe to the lower metal ring.

13. The wellhead coupling of claim 6, which further comprises:
one or more outer rings adapted to be connected to the outer wall of the lower end of the outer pipe, and a plurality of through holes extending vertically through one of the one or more outer rings;
threaded holes formed in the clamp housing to align with the through holes of the one of the one or more outer rings; and
threaded members adapted to extend through the through holes in the one of the one or more outer rings and into the threaded holes of the clamp housing to connect the outer ring, and thus the outer pipe, to the clamp housing.

* * * * *